US010878729B2

(12) United States Patent
Hanson

(10) Patent No.: US 10,878,729 B2
(45) Date of Patent: Dec. 29, 2020

(54) APPARATUS AND METHOD FOR DISPLAYING A THREE-DIMENSIONAL IMAGE

(71) Applicant: HANSON ROBOTICS LIMITED, Shatin (HK)

(72) Inventor: David Hanson, Tai Po (HK)

(*) Notice: Subject to any disclaimer, the term of this patent is extended or adjusted under 35 U.S.C. 154(b) by 0 days.

(21) Appl. No.: 16/258,528

(22) Filed: Jan. 25, 2019

(65) Prior Publication Data

US 2019/0156710 A1     May 23, 2019

Related U.S. Application Data

(63) Continuation of application No. PCT/CN2017/094217, filed on Jul. 25, 2017.

(60) Provisional application No. 62/367,087, filed on Jul. 26, 2016.

(51) Int. Cl.
| | | |
|---|---|---|
| G09F 9/302 | (2006.01) | |
| G09F 19/12 | (2006.01) | |
| G09G 3/00 | (2006.01) | |
| G09F 9/33 | (2006.01) | |
| G06F 1/3234 | (2019.01) | |
| G02B 30/54 | (2020.01) | |

(52) U.S. Cl.
CPC ............ *G09F 9/302* (2013.01); *G02B 30/54* (2020.01); *G06F 1/3265* (2013.01); *G09F 9/33* (2013.01); *G09F 19/12* (2013.01); *G09G 3/005* (2013.01)

(58) Field of Classification Search
CPC . G09F 9/302; G09F 9/33; G09F 19/12; G02B 30/54; G06F 1/3265; G09G 3/005
See application file for complete search history.

(56) References Cited

U.S. PATENT DOCUMENTS 9,507,162 B1 * 11/2016 Menon .................... B32B 38/06

FOREIGN PATENT DOCUMENTS

CN          102568329 A  *  7/2012  .......... H04N 13/393

* cited by examiner

Primary Examiner — Kenneth B Lee, Jr.
(74) Attorney, Agent, or Firm — Sheppard Mullin Richter & Hampton LLP

(57) ABSTRACT

An apparatus for displaying a three-dimensional image includes a base; a driving mechanism disposed on the base; a support element movably mounted to the base and controllably driven by the driving mechanism; and a light source set disposed on the support element and configured to controllably form a predetermined pattern of light emission; wherein the driving mechanism is configured to move the support element in a predetermined pattern of movement, a plural-ity of light emission patterns formed by the light source set during the movement of the support element collectively constituting a three-di-mensional image perceptible by a human eye. A method for displaying a three-dimensional image is also disclosed.

20 Claims, 6 Drawing Sheets

APPARATUS AND METHOD FOR DISPLAYING A THREE-DIMENSIONAL IMAGE

CROSS REFERENCE

This application is a continuation of International Patent Application No. PCTCN2017/094217, filed Jul. 25, 2017, which claims priority to U.S. patent application Ser. No. 62/367,087 filed Jul. 26, 2016 all of which are incorporated herein by reference in their entirety.

TECHNICAL FIELD

The present application relates to an apparatus and method for displaying a three-dimensional image.

BACKGROUND

Holographic display technologies are used to display three-dimensional images and animation and may be utilized in applications such as telepresence videoconferencing where it is desirable to provide the effect of a remotely located person being physically present.

Unfortunately, existing holographic display technologies tend to require relatively complex and expensive optical hardware and software processing systems as well as vast amounts of data to suitably render a single three-dimensional image. Whilst the use of existing holographic technologies is perceived to be desirable in certain applications, the relative costs and complexity of implementation has meant that it is not practical for day-to-day usage by the general public.

SUMMARY OF THE APPLICATION

The present application seeks to alleviate at least one of the above-described problems.

The present application may involve several aspects. Embodiments of the present application may include one or any combination of the different aspects herein described.

In an aspect, there is provided an apparatus for displaying a three-dimensional image, including: a base; a driving mechanism disposed on the base; a support element movably mounted to the base and controllably driven by the driving mechanism; and a light source set disposed on the support element and configured to controllably form a predetermined pattern of light emission; wherein the driving mechanism is configured to move the support element in a predetermined pattern of movement, a plurality of light emission patterns formed by the light source set during the movement of the support element collectively constituting a three-dimensional image perceptible by a human eye.

In another aspect, there is provided an apparatus for displaying a three-dimensional image, including: a microcontroller which is programmed to control an operation of the apparatus; a base; a driving mechanism disposed on the base; a support element movably mounted to the base and controllably driven by the driving mechanism; a light source set disposed on the support element and configured to controllably form a predetermined pattern of light emission; wherein the microcontroller comprises a processor, a memory store and an input interface; the memory store contains programming instructions readable by the processor; the processor is configured to perform the programming instructions to cause the driving mechanism to move the support element in a predetermined pattern of movement, a plurality of light emission patterns formed by the light source set during the movement of the support element collectively constituting a three-dimensional image perceptible by a human eye.

In a third aspect, there is provided a method for displaying a three-dimensional image, including: providing an apparatus for displaying a three-dimensional image, the apparatus comprising: a base; a driving mechanism disposed on the base; a support element movably mounted to the base and controllably driven by the driving mechanism; a light source set disposed on the support element and configured to controllably form a predetermined pattern of light emission; controlling the driving mechanism to move the support element in a predetermined pattern of movement, a plurality of light emission patterns formed by the light source set during the movement of the support element collectively constituting a three-dimensional image perceptible by a human eye.

BRIEF DESCRIPTION OF THE DRAWINGS

The present application will become more fully understood from the following detailed description of a preferred but non-limiting embodiments thereof, described in connection with the accompanying drawings, wherein.

DETAILED DESCRIPTION

Reference will now be made in detail to a preferred embodiment of the apparatus for displaying a three-dimensional image, examples of which are also provided in the following description. Exemplary embodiments of the display apparatus are described in detail, although it will be apparent to those skilled in the relevant art that some features that are not particularly important to an understanding of the display apparatus may not be shown for the sake of clarity.

Furthermore, it should be understood that the display apparatus is not limited to the precise embodiments described below and that various changes and modifications thereof may be effected by one skilled in the art without departing from the scope of the protection. For example, elements and/or features of different illustrative embodiments may be combined with each other and/or substituted for each other within the scope of this disclosure and appended claims.

Figure 1:
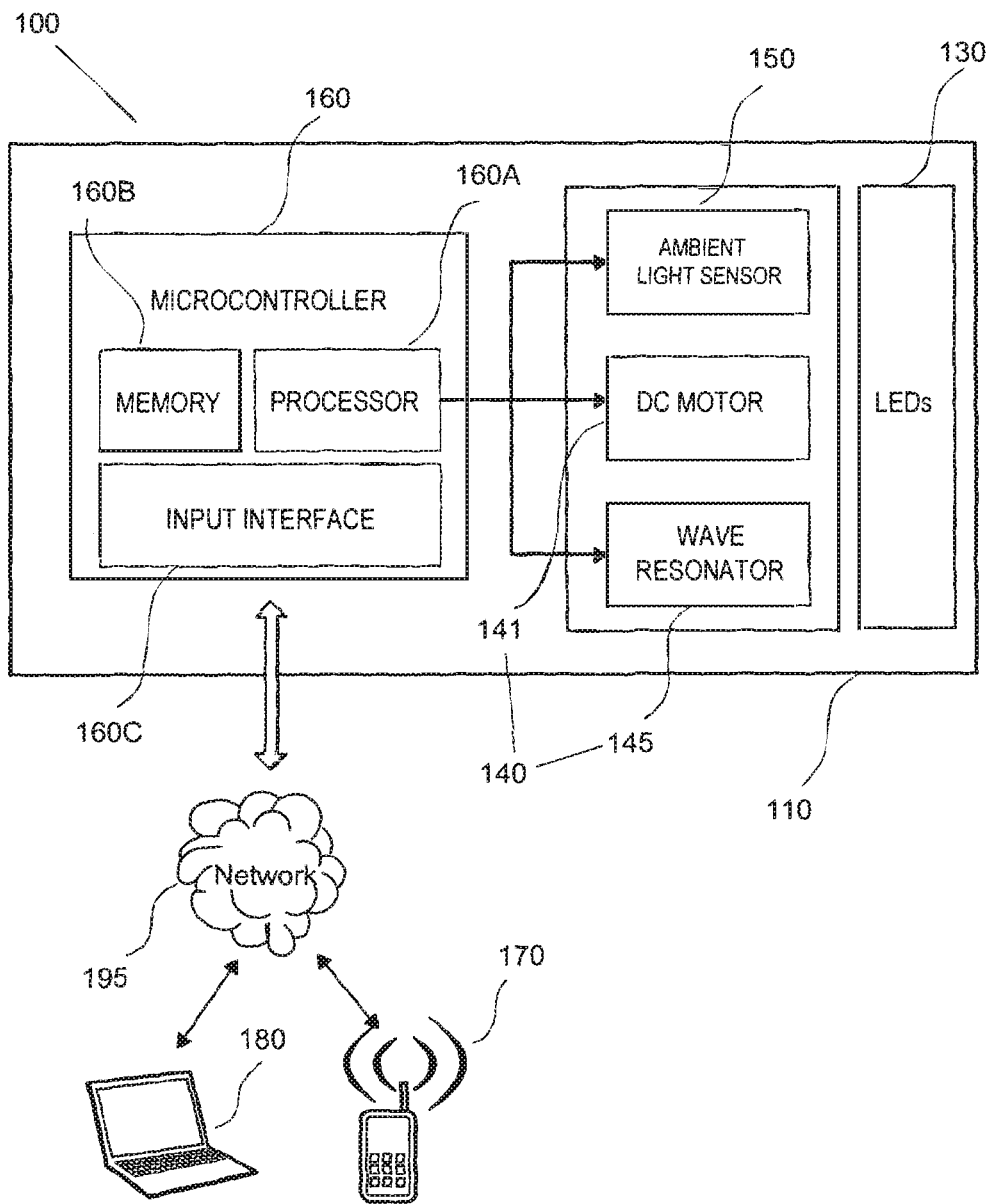
FIG. 1 is a functional block diagram of a display apparatus according to an exemplary embodiment of the present application.
Figure 2:
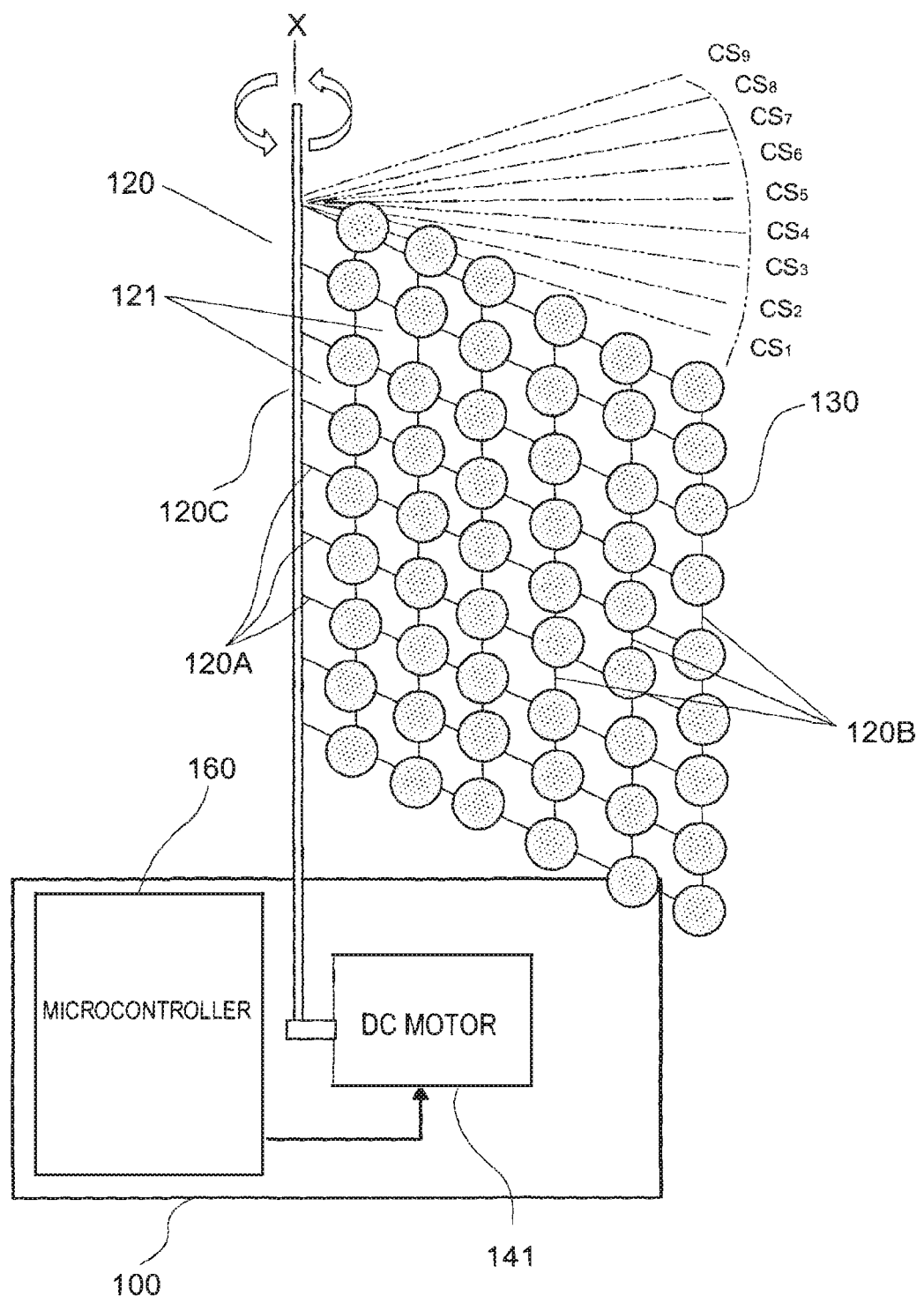
FIG. 2 depicts an exemplary support element according to an embodiment of the present application comprising a two-dimensional mesh upon which a plurality of light sources is mounted.

With reference to FIGS. 1 and 2, an exemplary embodiment of the present application provides an apparatus 100 for displaying a three-dimensional image. The apparatus 100 may include a base 110; a support element 120 movably mounted to the base 110; a light source set 130 disposed on the support element 120 and configured to controllably form a predetermined pattern of light emission; and a driving mechanism 140 disposed on the base 110. The base 110 may be configured to firmly secure the apparatus 100 in a substantially stationary position in its required location of operation. The driving mechanism 140 may be configured to move the support element 120 in a predetermined pattern of movement such that a plurality of light emission patterns formed by the light source set 130 during the movement of the support element 120 collectively constitute a three-dimensional image perceptible by a human eye. As an example, the driving mechanism 140 may include a DC motor 141. Furthermore, as shown in FIG. 1, the driving mechanism 140 may also include a wave resonator 145, as will be described below.

Embodiments of the present application may also include an ambient light sensor 150 calibrated to approximate sensitivity of a human eye to light emissions from under a variety of lighting conditions ranging from low-light to bright sunlight. Conveniently, the lighting characteristics of the light source set 130 may be dynamically adjusted to compensate for variation in the ambient lighting conditions sensed by the ambient light sensor 150. Conveniently, where the ambient light levels are higher, the chromatic and luminance components may be enhanced to provide more suitable visual definition against the ambient light background, whilst in low-light conditions, the chromatic and luminance components of the light source set 130 may be lowered to conserve power.

Conveniently, the displayed three-dimensional volumetric image may be used to simulate the appearance of a three-dimensional holographic image, however, utilizing relatively less complex and less costly componentry to render the image than would otherwise be incurred utilizing actual holographic image reproduction technology.

With continued reference to FIG. 1, a microcontroller 160 may be provided which may be programmed to control various aspects of the operation of the display apparatus 100 including the speed of movement of the support element 120, variations in the speed of motion and so on. The microcontroller 160 may include a processor unit 160A, a memory store 160B and an input interface 160C whereby commands are entered into the input interface 160C for the apparatus 100 to display desired images. The memory store 160B may contain programming instructions readable by the processor 160A to drive the driving mechanism 140 in a predetermined pattern of motion which suitably controls movement of the support element 120. The microcontroller 160 and interfacing circuitry may be conveniently housed in a hollow compartment of the base 110 adjacent the driving mechanism 140.

As shown in FIG. 1, the apparatus 100 may be used as a peripheral device attachable to a laptop 180 or a smartphone 170 via a wired (e.g., USB) or wireless communication protocol link such as a network 195. The apparatus 100 may be a compact display which may be used for any number of purposes including as a learning aid for users to visualize subject matter that involve substantial three-dimensional aspects. Alternatively, the compact display may serve as a novelty item for reproducing pre-recorded birthday greetings from family member or friends or even fictional characters. Compact embodiments of this nature may be implemented using a single-filament support element rotatably movable around multiple axes from a single point of rotation on a compact base, as will be discussed in detail below. The support element may include one more spring elements.

Referring to FIG. 2, the light source set 130 may include a plurality of light sources 130 disposed on the support element 120 in a uniformly spaced-apart configuration. The support element 120 may include a two-dimensional mesh structure comprising first and second sets of mesh wires 120A, 120B arranged in a crisscross pattern. The mesh wires 120A, 120B are of suitable material (aluminum, carbon fiber, nylon, or spring steel, etc.), shape (rectangle, or square, etc.) and dimensions to support the weight of the plurality of light sources 130 mounted to it and are also suitably shaped and dimensioned to alleviate air resistance when the mesh of the support element 120 is moved back and forth in reciprocating motion relative to the base 110 during operation of the display apparatus 100, as will be described in further detail below. The support element 120 may include an elongate shaft 120C connecting with the mesh structure and having one end operably-coupled to the suitably powered DC motor 141 housed within the base 110 whereby the DC motor 141 is able to rotate the two-dimensional mesh structure of the support element 120 in reciprocating motion around an axis X of the elongate shaft 120C in use.

The plurality of light sources 130 may be a plurality of RGB light emitting diodes LEDs which function as three-dimensional volumetric pixels i.e. "voxels" of the image displayed by the apparatus 100. The number of LEDs that are utilized will depend upon the size, dimensions and suitability of the material comprising the mesh of the support element 120 that is capable of supporting the weight of the LEDs 130 without compromising operational performance. The number of LEDs 130 that are used should be such as is necessary to provide a requisite degree of image definition of the three-dimensional volumetric image compatible with the specific application.

The LEDs 130 are soldered to the mesh of the support element 120 at the intersections of the first and second transverse sets of wires 120A, 120B so that the apertures 121 are not blocked and air resistance against the mesh of the support element 120 is minimized as the mesh of the support element 120 is moved in reciprocating motion. Conveniently, the first set of wires 120A are configured to serve as a ground terminal and the second set of wires 120B are configured to serve as an active terminal of a power supply such that the LEDs 130 are able to be both supported by the mesh 120 and also draw power from the mesh 120 when suitably attached thereon.

In alternate embodiments of the present application, the plurality of light sources 130 may be integrally formed in a thin film display technology such as POLED (flexible organic light-emitting device) comprising a relatively flexible, durable and lightweight base substrate such as clear plastic film or reflective metal foil. In such embodiments, a two-dimensional POLED substrate having the plurality of light sources integrally formed therein may be attached to the two-dimensional mesh of the support element. Openings may also be punched in the POLED material to reduce air resistance when the POLED material is moved in reciprocating motion with the mesh.

To display a desired three-dimensional volumetric image, the two-dimensional mesh of the support element 120 is rotated around the axis of the elongate shaft 120C in reciprocating motion. At predetermined spatial increments along the arc of rotation, the LEDs 130 disposed on the two-dimensional mesh of the support element 120 are controllably illuminated in accordance with a predetermined sequence of illumination patterns. Each of the illumination patterns along the arc of rotation, i.e., each of the plurality of light emission patterns formed by the light source set 130 during the movement of the support element 120, are configured to render a cross-section CS1 ... CS9 appearance of the overall three-dimensional volumetric image and whereby all of the rendered cross-sections CS1 ... CS9 of the image as shown in FIG. 2 are perceived by the human eye as an overall three-dimensional volumetric image based on the principle persistence of vision. As the mesh is rotated in back and forth motion, the plurality of LEDs 130 may be configured to refresh certain cross-sections CS1 ... CS9 of the three-dimensional image with the same illumination characteristics on multiple passes for instance where such cross-sections of the image are intended to appear static, or, may be configured to sequentially vary the illumination characteristics of certain cross-sections for instance in order to provide the perception of movement. The degree of definition of the three-dimensional image may be controlled by a number of factors including controlling the speed of reciprocating motion of the mesh, the magnitude of spatial increments between rendered cross-sections of the three-dimensional images, the number of cross-sections of the image that are rendered, the number of LEDs disposed on the mesh, as well as the range of illumination of each LED that are able to be varied. Any of these factors may be controllably varied in the design and implementation of embodiments of the present application depending upon the specific requirements and application involved. The microcontroller 160 may be programmed to controllably vary the illumination characteristics of the light source set 130 at each of the cross-sections CS1 ... CS9 of the image being displayed as the light source set 130 are rotated around on the mesh of the support element 120. In addition, the predetermined pattern of light emissions may include a predetermined color and luminance characteristic of the light emissions.

Movement of the support element 120 need not necessarily be reciprocating motion and may involve motion in any number of predetermined patterns. It would be appreciated that in embodiments of the present application, the support element 120 may be controllably moved in any number of ways including at least one of a rotational motion, a reciprocating motion, an oscillatory motion, a wave-like motion and a sliding motion. For example, the display apparatus 100 may include one or more guide tracks/rails disposed on the base 110, and the support element 120 may be configured to be controllably moved in the sliding motion along the one or more guide tracks/rails. Also, in embodiments of the present application, the pattern of movement of the support element may involve variable speed and/or variable acceleration as it is progressed along the predetermined path of movement in rendering the various cross-sections of the three-dimensional. Thus, for instance, the support element 120 may be positioned for a longer duration at certain cross-sections than at others. In an embodiment, the illumination characteristics of each of the LEDs 130, such as the chromatic and luminance components, may be controllably varied to assist in providing contrast and texturing of the image at each cross-section CS1 ... CS9 rendered.

In other applications, it is envisaged that the three-dimensional display apparatus may be utilized as a real-time telepresence device whereby the three-dimensional spatial co-ordinates and geometry of a remote user's human face as well as the lighting and textural features of the facial features may be scanned by the camera of the smartphone 170 or laptop 180 as show in FIG. 1. The scanned features are able to be processed by a software application running on the smartphone 170 to extract the requisite facial information and converted into input control instructions to allow reproduction of these features by the three-dimensional display apparatus. These input control instructions are communicated via the communication network 195 such as the Internet to the three-dimensional display apparatus 100 and the microcontroller 160 is configured to controllably move the support element 120 and controllably illuminate the plurality of LEDs 130 disposed thereon in a manner described above so as to suitably reproduce the scanned facial image by reference to the received input control instructions.

In seeking to enhance the realism of the facial features rendered, the support element 120 is further configured with a three-dimensional shape contour which generally approximates the curved contours of the eye regions of a humanoid head. In such applications, a POLED or similar type thin film light emission technology may be more suitable for use in providing the plurality of light sources on the three-dimensional curved contours of the support element.

Figure 3:
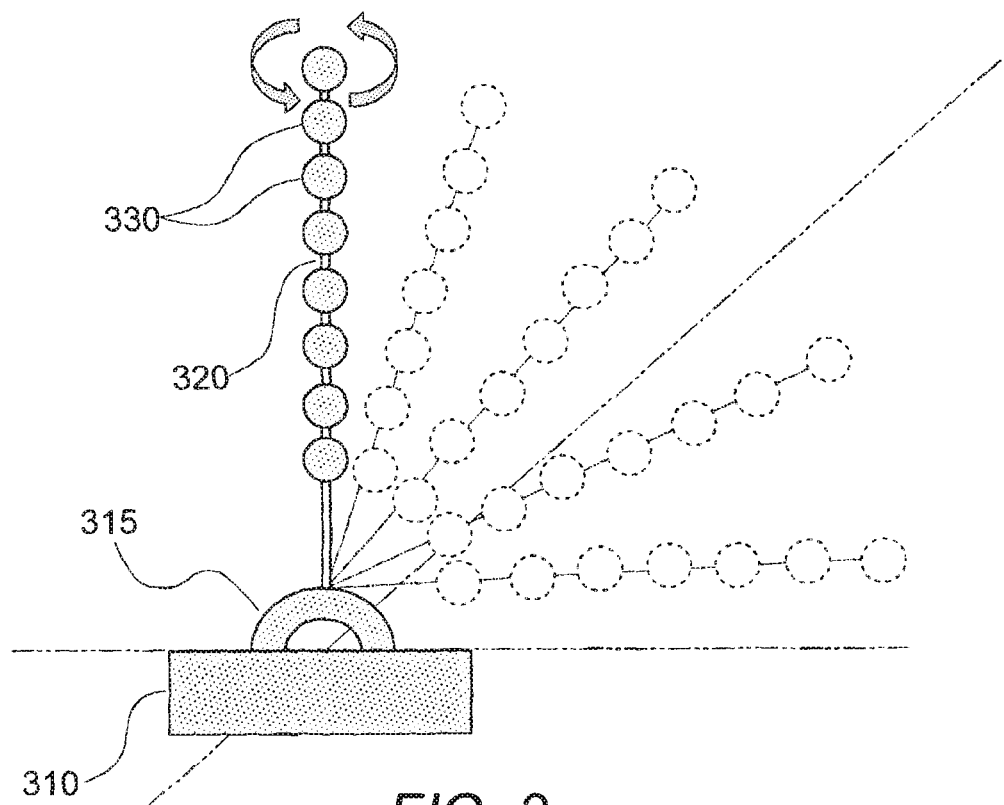
FIG. 3 depicts an exemplary thin filament support element according to an embodiment of the present application upon which a plurality of light sources is mounted.
Figure 4:
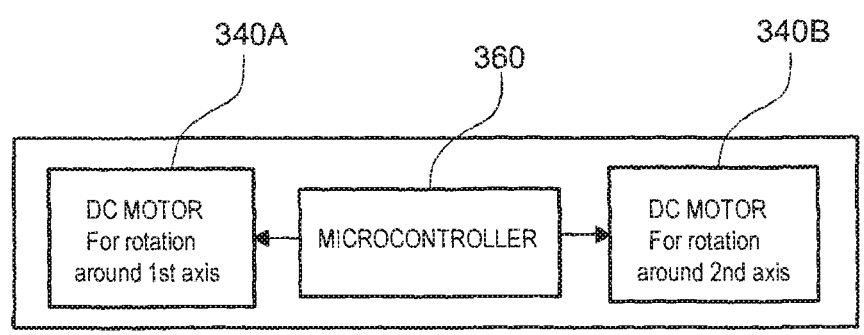
FIG. 4 depicts a functional block diagram of one aspect of the embodiment shown in FIG. 3 where a microcontroller is interfaced with multiple DC motors to drive movement of the thin filament support element in multiple axes.
Figure 5:
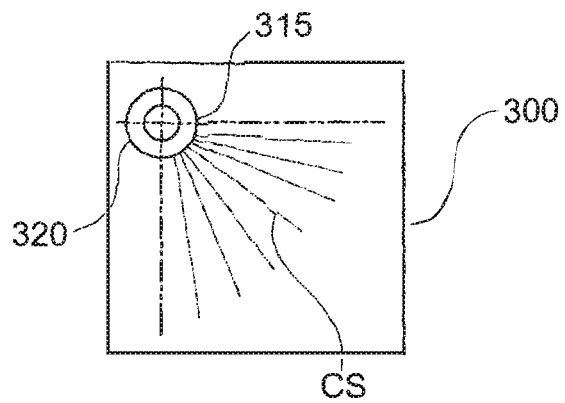
FIG. 5 depicts a topographical view of the embodiment shown in FIG. 3 illustrating that the cross-sectional planes of a three-dimensional image that are able to be rendered as the thin filament support element is rotated about in multiple axes.

In alternative embodiments of the present application, the support element need not be a two-dimensional structure. For instance, as shown in FIGS. 3 to 5, the support element of the display apparatus 300 may include a thin elongate filament 320 or the like having light sources 330 arranged along the length of the thin filament 320. The filament 320 could be configured for attachment to the base 310 via a rotating turret 315 whereby the filament 320 is controllably movable in multiple axes relative to the base 310 in order to render the three-dimensional volumetric image. For instance, the filament 320 may be rotated about the turret 315 in a first plane in reciprocating fashion whereby the light sources 330 disposed on the filament 320 are controllably illuminated to suitably render a two-dimensional representation of a cross-section of the three-dimensional image. As the turret 315 is rotated about the base 310, the filament 320 is able to be rotated about the turret 315 to render different cross-sections of the three dimensional volumetric image. FIG. 5 shows a topographical view of each of the cross-sectional planes CS of the three dimensional volumetric image that are rendered as the turret 315 rotates about the base 310—i.e. shown as dotted lines extending radially away from the turret 315 in the top view. As shown in the functional block diagram of FIG. 4, the microcontroller 360 is interfaced with multiple DC motors 340A, 340B to controllably rotate the filament 320 relative to the turret 315, and, to rotate the turret 315 relative to the base 310, respectively. Advantageously, in addition to being compact in nature and more easily stowed when not in use, the use of a single filament type configuration alleviates the need for a heavier and more cumbersome two-dimensional support element and may render each two-dimensional cross-section of the three-dimensional volumetric image sequentially utilizing less hardware componentry and alleviating the associated hardware costs.

Figure 6:
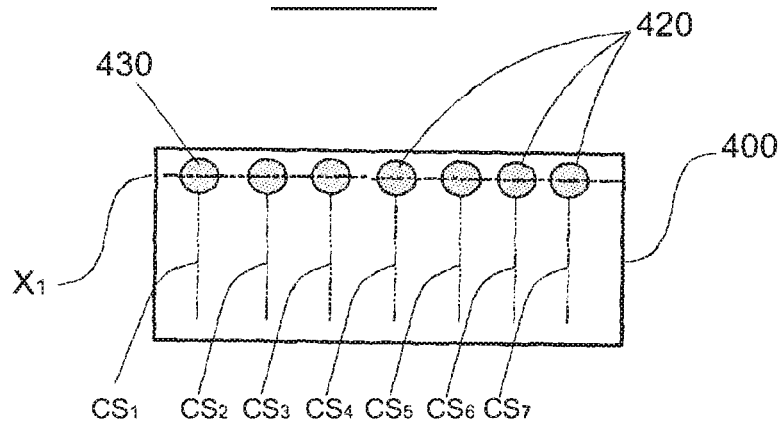
FIG. 6 depicts a further embodiment of the present application comprising multiple thin filament support elements with light sources disposed thereon which are each rotatably movable to render a unique cross-section of a three-dimensional image, and whereby the multiple support elements are arranged m alignment along a common axis of rotation.
Figure 7:
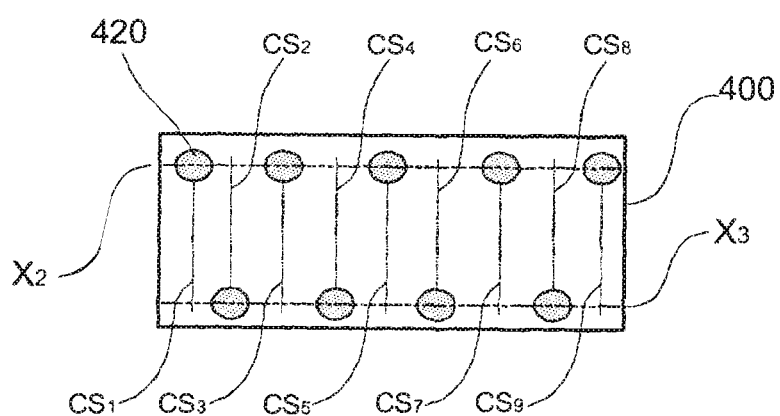
FIG. 7 depicts a further embodiment of the present application comprising multiple thin filament support elements with light sources disposed thereon which are each rotatably movable to render a unique cross-section of a three-dimensional image, and whereby the multiple support elements are arranged in staggered arrangement along two parallel axes of rotation.

Yet, as shown in the topographical views of FIGS. 6 and 7, a plurality of filaments 420 may be employed with light sources 430 disposed along their lengths. In one exemplary configuration shown in FIG. 6, each of the plurality of filaments 420 are aligned along and configured to rotate in reciprocating motion around a common axis X1 to render the different cross-sections of the three-dimensional volumetric image. Alternatively, as shown in FIG. 7, the plurality of filaments 420 may be arranged in staggered formation along two parallel axes X2, X3 and configured to rotate around the two parallel axes X2, X3 in interlacing fashion. In each configuration, the plurality of filaments 420 may be configured to be rotated simultaneously, or, may be rotated independently of each other.

Figure 8:
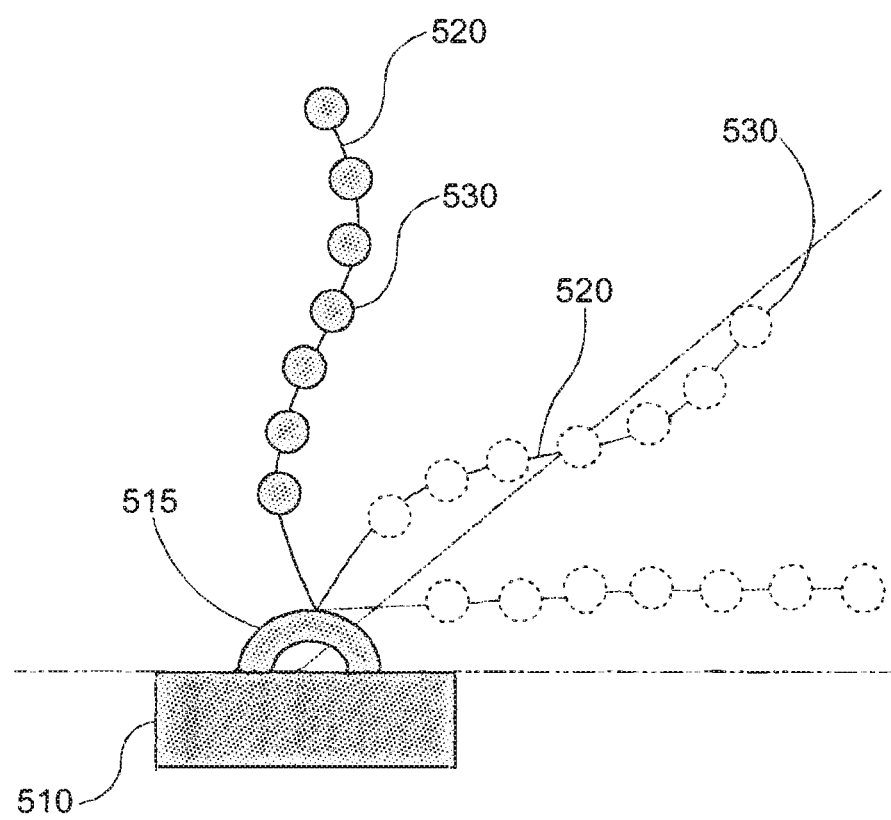
FIG. 8 depicts a further embodiment of the present application where a suitably flexible thin filament support element is shown to have standing wave induced in it to controllably hold light sources m substantially fixed positions based on the standing wave properties.

Referring to FIG. 8, the support element used in certain embodiments of the present application may be formed from a suitably flexibly deformable material whereby a standing wave may be induced in the support element 520 during operation. By controlling the properties of the standing wave induced in the flexible support element 520 light sources 530 disposed on the support element 520 are able to be controllably positioned or concentrated in a desired position. Referring back to FIG. 1, any number of off-the-shelf type wave resonators 145 may be suitably interfaced with the flexible support element filament 520 to induce a standing wave in the flexible support element 520. Conveniently, the relative positions, configurations and distances between the plurality of light sources disposed on the support element are able to be controllably varied in this manner, so as to allow for a greater degree of complexity and flexibility in the three-dimensional images rendered.

Figure 9:
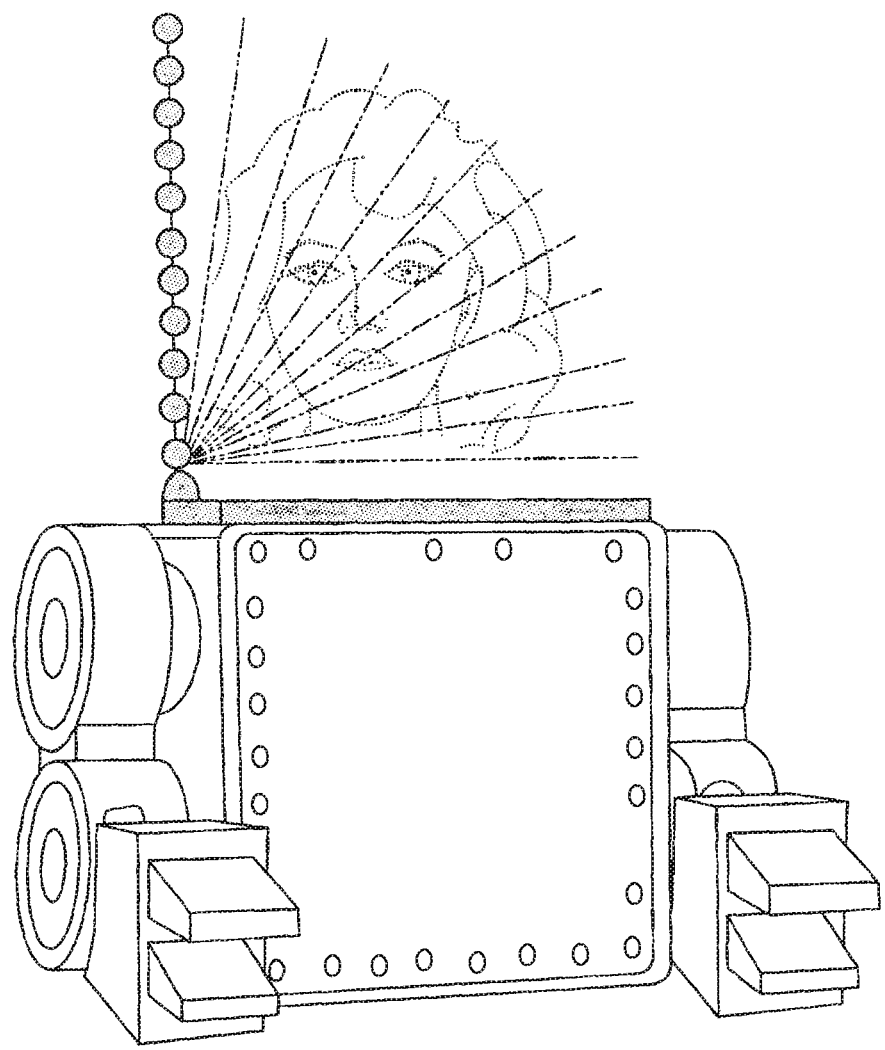
FIG. 9 depicts an exemplary application of an embodiment of the present application where the embodiment is used to render a head and face of a robotics system in place of a physical robotic head and face.

Embodiments of the present application may have a multitude of useful commercial applications including for instance interfacing with a robotic system to render the animated visual appearance of the robot's head and face as shown in FIG. 9. Advantageously, this may provide a more versatile and lightweight substitute for a physical head and face of a robotic system and may be particularly useful in mobile robotic systems to minimize power consumption and alleviate maintenance costs and complexities associated with conventional three-dimensional display hardware and components.

In yet alternate embodiments of the present application, a concave lens is positioned over the support element described above, whereby the lens is configured such that patterns of light emissions emitted from the plurality of light sources on the support element are perceptible through the lens by the human eye as a three-dimensional image or animation.

An exemplary embodiment of the present provides a method for displaying a three-dimensional image. The method may include providing an apparatus for displaying a three-dimensional image including: a base; a driving mechanism disposed on the base; a support element movably mounted to the base and controllably driven by the driving mechanism; and a light source set disposed on the support element and configured to controllably form a predetermined pattern of light emission. The method may further include controlling the driving mechanism to move the support element in a predetermined pattern of movement such that a plurality of light emission patterns formed by the light source set during the movement of the support element collectively constitute a three-dimensional image perceptible by a human eye.

The following description is intended to provide an overview of device hardware and other operating components suitable for performing the methods of the invention described herein. This description is not intended to limit the applicable environments or the scope of the invention. Similarly, the hardware and other operating components may be suitable as part of the apparatuses described above. Some portions of the detailed description are presented in terms of algorithms and symbolic representations of operations on data bits within a computer memory. These algorithmic descriptions and representations can be used by those skilled in the computer and software related fields. In one embodiment, an algorithm is here, and generally, conceived to be a self-consistent sequence of operations leading to a desired result. The operations performed as methods stops or otherwise described herein are those requiring physical manipulations of physical quantities. Usually, though not necessarily, these quantities take the form of electrical or magnetic signals capable of being stored, transferred, combined, transformed, compared, and otherwise manipulated.

The present invention, in some embodiments, also relates to the apparatus for performing the operations herein. This apparatus may be specially constructed for the required purposes, or it may include a general purpose computer selectively activated or reconfigured by a computer program stored in the computer.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below.

Embodiments of the invention may be implemented in many different forms, including, but in no way limited to, computer program logic for use with a processor (e.g., a microprocessor, microcontroller, digital signal processor, or general purpose computer), programmable logic for use with a programmable logic device, (e.g., a Field Programmable Gate Array (FPGA) or other PLD), discrete components, integrated circuitry (e.g., an Application Specific Integrated Circuit (ASIC)), or any other means including any combination thereof. In a typical embodiment of the present invention, the processor-based system is implemented as a set of computer program instructions that is converted into a computer executable form, stored as such in a computer readable medium, and executed by a microprocessor under the control of an operating system. Thus, user interlace instructions can be transformed into processor understandable instructions suitable using various and other features and embodiments described herein.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink-wrapped software), preloaded with a computer system (e.g., on system ROM or fixed disk), or distributed from a server or electronic bulletin board over the communication system (e.g., the internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Memory may also include any means for storing software or other instructions including, for example and without limitation, a hard disk, an optical disk, floppy disk, DVD (digital versatile disc), CD (compact disc), memory stick, flash memory, ROM (read only memory), RAM (random access memory), DRAM (dynamic random access memory), PROM (programmable ROM), EEPROM (extended erasable PROM), and/or other like computer-readable media or machine-readable medium.

The term "computer-readable media" or "machine-readable medium" includes any medium that is capable of storing, encoding or carrying a set of instructions for execution by a computer or a machine and that cause the computer or machine to perform any one or more of the methodologies of the present disclosure. While the computer-readable media or machine-readable medium is shown in an example embodiment to be a single medium, the term "computer-readable media" or "machine-readable medium" should be taken to include a single medium or multiple media (e.g., a database, one or more centralized or distributed databases and/or associated caches and servers) that store the one or more sets of instructions.

It is to be understood that the figures and descriptions of the disclosure have been simplified to illustrate elements that are relevant for a clear understanding of the disclosure, while eliminating, for purposes of clarity, other elements. Those of ordinary skill in the art will recognize, however, that these and other elements may be desirable. However, because such elements are well known in the art, and because they do not facilitate a better understanding of the disclosure, a discussion of such elements is not provided herein. It should be appreciated that the figures are presented for illustrative purposes and not as construction drawings. Omitted details and modifications or alternative embodiments are within the purview of persons of ordinary skill in the art.

The use of headings and sections in the application is not meant to limit the disclosure; each section can apply to any aspect, embodiment, or feature of the disclosure.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise.

It should be understood that the order of steps or order for performing certain actions is immaterial so long as the present teachings remain operable. Moreover, two or more steps or actions may be conducted simultaneously.

Those skilled in the art will appreciate that the application described herein is susceptible to variations and modifications other than those specifically described without departing from the scope of the application. All such variations and modification which become apparent to persons skilled in the art should be considered to fall within the spirit and scope of the application as broadly hereinbefore described. It is to be understood that the application includes all such variations and modifications. The application also includes all of the steps and features, referred or indicated in the specification, individually or collectively, and any and all combinations of any two or more of said steps or features.

The reference to any prior art in this specification is not, and should not be taken as, an acknowledgment or any form of suggestion that that prior art forms part of the common general knowledge.

What is claimed:

1. An apparatus for displaying a three-dimensional image, comprising:
    a microcontroller which is programmed to control an operation of the apparatus;
    a base;
    a driving mechanism disposed on the base;
    a support element movably mounted to the base and controllably driven by the driving mechanism;
    a light source set disposed on the support element and configured to controllably positioned in accordance with a pattern of position and controllably form a pattern of light emission;
    wherein a three-dimensional shape contour of the support element is re-configurable;
    wherein the microcontroller comprises a processor, a memory store and an input interface; the memory store contains programming instructions readable by the processor; the processor is configured to perform the programming instructions to determine the pattern of position and the pattern of light emission for the light source set and the three-dimensional shape contour and a pattern of movement for the support element in accordance with the three-dimensional image, to re-configure the support element in the three-dimensional shape and to cause the driving mechanism to move the re-configured support element in the pattern of movement; wherein the light emission pattern formed by the light source set in the pattern of position during the movement of the re-configured support element generates a three-dimensional image perceptible by a human eye.

2. The apparatus of claim 1, wherein the support element is formed from a flexibly deformable material, and the driving mechanism comprises a wave resonator interfaced with the support element and configured to induce a standing wave in the support element, wherein the light source set is controlled positioned in accordance with the standing wave.

3. The apparatus of claim 1, wherein the support element is controllably moveable in accordance with a reciprocating motion.

4. The apparatus of claim 3, wherein the support element is further controllably moveable in accordance with a rotational motion.

5. The apparatus of claim 1, further comprising an ambient light detector detecting ambient light information, wherein the pattern of movement and the pattern of light emission is configured to be modified by reference to the detected ambient light information.

6. The apparatus of claim 1, wherein the support element comprises an elongate shaft and a mesh structure connected to the elongate shaft.

7. The apparatus of claim 6, wherein the mesh structure comprises a first set of mesh wires and a second set of mesh wires arranged in a crisscross pattern.

8. The apparatus of claim 7, wherein the light source set comprise a plurality of light emitting diode (LED), and each LED is soldered at an intersection of the first and second set of mesh wires.

9. The apparatus of claim 1, wherein the processor is configured to perform the programming instructions to vary the illumination characteristics of a light source of the light source set in accordance with the pattern of light emission.

10. The apparatus of claim 1, wherein the three-dimensional shape contour generally approximates a curved contour of an eye region of a humanoid head.

11. A method for displaying a three-dimensional image, comprising:
determining a pattern of position and a pattern of light emission for a light source set disposed on a support element in accordance with the three-dimensional image;
determining a pattern of movement for the support element in accordance with the three-dimensional image;
reconfiguring a three-dimensional shape contour of the support element in accordance with the three-dimensional image;
positioning the light source set on the support element in accordance with the pattern of position;
lighting the light source set in accordance with the pattern of light emission; and
moving the re-configured support element by a driving mechanism in accordance with the pattern of movement;
wherein the light emission pattern formed by the light source set in the pattern of position during the movement of the re-configured support element generates a three-dimensional image perceptible by a human eye.

12. The method of claim 11, wherein the support element is formed from a flexibly deformable material, and the driving mechanism i-s comprises a wave resonator interfaced with the support element and configured to induce a standing wave in the support element, wherein the light source set is controlled positioned in accordance with the standing wave.

13. The method of claim 11, further comprising moving the support element in accordance with a reciprocating motion.

14. The method of claim 13, further comprising moving the support element in accordance with a rotational motion.

15. The method of claim 11, further comprising detecting ambient light information by an ambient light detector, wherein the pattern of movement and the pattern of light emission is configured to be modified by reference to the detected ambient light information.

16. The method of claim 11, wherein the support element comprises an elongate shaft and a mesh structure connected to the elongate shaft.

17. The method of claim 16, wherein the mesh structure comprises a first set of mesh wires and a second set of mesh wires arranged in a crisscross pattern.

18. The method of claim 17, wherein the light source set comprise a plurality of light emitting diode (LED), and each LED is soldered at an intersection of the first and second set of mesh wires.

19. The method of claim 11, further comprising varying the illumination characteristics of a light source of the light source set in accordance with the pattern of light emission.

20. The method of claim 11, wherein the three-dimensional shape contour generally approximates a curved contour of an eye region of a humanoid head.

* * * * *